Jan. 16, 1962  E. R. ANDERSON  3,016,937
MANUAL CLINGSTONE PEACH SPLITTER
Filed Dec. 15, 1959  2 Sheets-Sheet 1
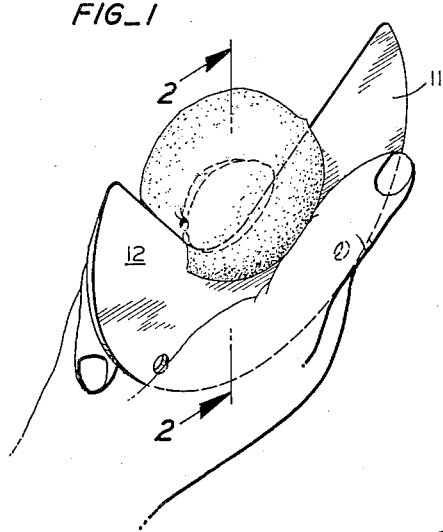
FIG_1
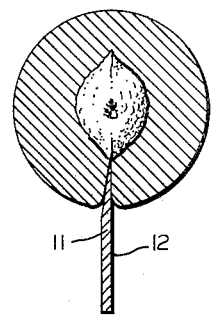
FIG_2
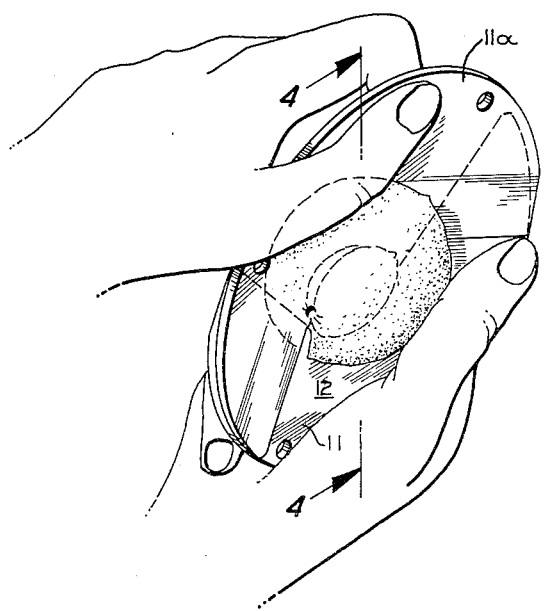
FIG_3
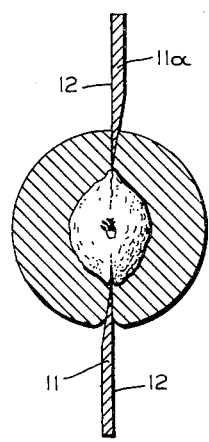
FIG_4
INVENTOR.
EARL R. ANDERSON
BY
ATTORNEYS

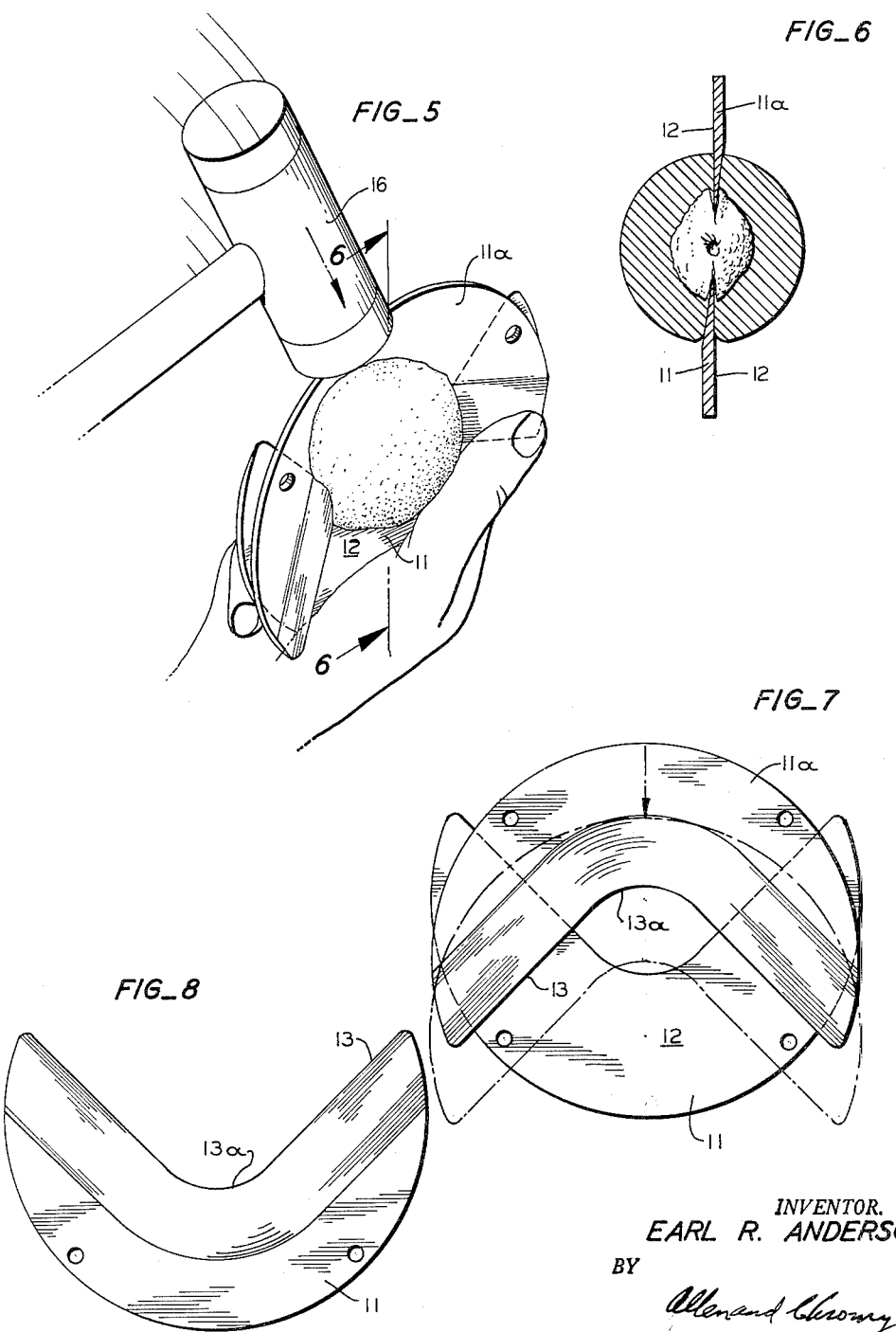

United States Patent Office 3,016,937
Patented Jan. 16, 1962

3,016,937
MANUAL CLINGSTONE PEACH SPLITTER
Earl R. Anderson, 1900 Pollard Road, Campbell, Calif.
Filed Dec. 15, 1959, Ser. No. 859,688
1 Claim. (Cl. 146—72)

The present invention relates to a manually operable halving device for halving clingstone peaches to provide half peaches containing half pits for experimental purposes.

At times during the year there are clingstone peaches available for experimental use when commercial canneries are not in operation, and commercial canneries are usually the only source of half peaches with half pits therein. Thus it is desirable to have a device for easily and quickly producing from whole clingstone peaches the half peaches with half pits therein.

Accordingly, it is an object of the instant invention to provide a simple device enabling manual production from whole clingstone peaches of half peaches with half pits therein.

The above object of the invention, together with others are attained as will become apparent from the following description of a preferred embodiment of the invention, taken in connection with the accompanying drawings, in which:

FIGURE 1 is a perspective view of one pit-halving blade held in the hand of the operator with a whole peach impaled thereon.

FIGURE 2 is a sectional view taken as illustrated by the line 2—2 in FIGURE 1.

FIGURE 3 is a perspective view with two of the pitting blades in cooperation scissors-like relation, illustrated as being held between two hands of the operator and with the whole peach operatively engaged therewith.

FIGURE 4 is a sectional view taken as illustrated by the line 4—4 in FIGURE 3.

FIGURE 5 is a view similar to FIGURE 3 showing a mallet employed to produce the impact pit-halving operation.

FIGURE 6 is a sectional view taken as illustrated by the lines 6—6 in FIGURE 5.

FIGURE 7 is an elevational view of two of the pit-halving blades in their scissors-like relation as employed in connection with the peach pit.

FIGURE 8 is an elevational view of one of the peach pit-splitting blades.

Referring to FIGURES 7 and 8 there is illustrated the peach pit-halving device of the instant invention in which two identical halving blades 11 and 11a are illustrated, each blade having one side formed recessed in general V shape to provide a cutting edge 13 which is formed by grinding on one side only of the blade. The apex of the cutting edge 13 is rounded as at 13a to conform generally to the rounded edge or side of a peach pit in its suture phase. The grinding operation provides a smooth contour of the cutting edge and the adjacent metal. As seen most clearly in FIGURE 6, the two peach-splitting blades 11 and 11a have respective planar sides 12 which are engaged to place the blades in scissors-like adjacency and to provide for a translatory scissors-like action between the blades along a line.

In employing the blades, one of the blades is held for example as shown in FIGURE 1, and a peach is impaled thereon by placing the blade in the plane of the suture line and penetrating the flesh of the fruit with the blade until the blade is in contact with the pit, so that the side 12 of the blade in effect forms a continuation of the plane of natural separation of the pit. The length of the cutting edge of each blade at either side of the apex of the blade is sufficiently long to provide for severing of at least half of the flesh of a fruit by each blade.

Subsequently, the second blade 11a is grasped in the other hand and placed in scissors-like adjacency with respect to the first blade 11 and also caused to penetrate the flesh of the fruit until it is engaged with the pit as shown in FIGURES 3 and 4. This operation places the blades in mutual overlapping supporting relation with each other at each end. Then the assembly of the two halving blades and the whole peach are held for example in the right hand as shown in FIGURE 5, and a mallet 16 or other similar article is used to impact one of the blades, for example the blade 11a as shown in this drawing. The first impact usually serves to seat the blades firmly against the peach pit, and the second impact serves to effect severing of the peach pit along its natural line of severance so that two half peaches with the pit halves therein are provided from a whole clingstone peach.

While I have shown and described a preferred embodiment of the invention, it will be understood that the invention is capable of variation and modification from the form shown so that its scope should be limited only by the scope of the claim appended hereto.

What I claim is:
A device for halving of clingstone peaches by manual impact operation to provide half peaches with half pits therein for experimental use, said device comprising a pair of similar splitting blades, each blade having one planar side for disposition in scissors-like adjacency with the similar side of the other blade, in mutual overlapping supporting relation with each other at each end, said blades being separate and the scissors-like adjacency thereof providing the only connection therebetween, each blade having a V-shaped recess defined by a cutting edge, the apex of the V-shaped recess being curved to conform substantially to the contour of a peach pit in a plane containing the suture line of a peach, each of said edges having a length at either side of said apex providing for severing of at least half of the flesh of the fruit by translatory approaching movement of the blades along a line, the cutting edge of each blade being formed by a bevel on the side of said recess opposite to said planar side whereby a pair of said blades may be caused to penetrate the flesh of a whole clingstone peach in a plane containing the plane of the suture line and to be placed in firm engagement with the pit in the fruit, each of said blades providing easy-to-see adjustment of a peach and a blade to be engaged therewith to insure accurate alignment of the suture plane of the peach with the blade, and each blade being manually oscillatable with respect to a peach and the other blade to insure complete severing of the flesh of the fruit and firm engagement of a blade with the pit of the fruit, and whereby one of the blades may thereafter be impacted to cause severance of the peach into two peach halves containing half pits.

References Cited in the file of this patent
UNITED STATES PATENTS

| | | |
|---|---|---|
| 580,563 | Totten | Apr. 13, 1897 |
| 1,531,903 | Cummins | Mar. 31, 1925 |
| 2,255,533 | Ridley | Sept. 9, 1941 |